United States Patent
Dietrich, Sr.

[11] Patent Number: 5,862,763
[45] Date of Patent: Jan. 26, 1999

[54] APPARATUS FOR HIGH SPEED APPLICATION OF LIQUID OR DRY FERTILIZER

[75] Inventor: William J. Dietrich, Sr., Congerville, Ill.

[73] Assignee: DMI, Inc., Goodfield, Ill.

[21] Appl. No.: 811,549

[22] Filed: Mar. 4, 1997

Related U.S. Application Data

[60] Provisional application No. 60/012,877 Mar. 5, 1996.

[51] Int. Cl.$^6$ ...................................................... A01B 35/16
[52] U.S. Cl. .............................................. 111/121; 111/52
[58] Field of Search ............................. 111/52, 118, 121, 111/127, 128, 28, 140, 150, 157, 161, 162, 163, 167, 168, 170; 172/604

[56] References Cited

U.S. PATENT DOCUMENTS

| | | | |
|---|---|---|---|
| 1,234,372 | 7/1917 | Miller ...................................... | 111/168 |
| 2,357,528 | 9/1944 | Lutes ..................................... | 172/604 X |
| 2,876,718 | 3/1959 | Vaughar .............................. | 111/167 X |
| 3,504,646 | 4/1970 | Trahms .................................... | 111/121 |
| 4,117,788 | 10/1978 | Whitehead ............................ | 111/52 X |
| 4,408,551 | 10/1983 | Keller et al. ........................... | 111/163 |
| 4,574,715 | 3/1986 | Dietrich et al. . | |
| 4,596,199 | 6/1986 | Dietrich et al. . | |
| 4,723,495 | 2/1988 | Dietrich et al. . | |
| 4,998,488 | 3/1991 | Hansson . | |
| 5,309,852 | 5/1994 | Zimmerman ............................ | 111/121 |
| 5,437,337 | 8/1995 | Dietrich . | |
| 5,595,130 | 1/1997 | Baugher et al. .......................... | 111/52 |

OTHER PUBLICATIONS

Sukup brochure "Air Delivery Deep Placement Fertilizer Applicator" (2 Pgs.).
Dutch Industries, Ltd. brochure "High Speed Coulter" (2 pgs.).
Flexi–coil brochure "The Barton Opener" (2 pgs.).
Flexi–coil brochure "6000 No–Till Air Drill" (2 pgs.) (no date).
DMI brochure "Nutri–Plac'r 2800 Liquid Fertilizer Applicator" (2 pgs.) (no date).

*Primary Examiner*—Michael J. Carone
*Assistant Examiner*—Robert Pezzuto
*Attorney, Agent, or Firm*—Emrich & Dithmar

[57] ABSTRACT

A unique coulter has a flat band adjacent the peripheral cutting edge to form a slot. Inwardly of this flat band, and on one side of the coulter blade is an inclined compacting surface. The outer, cutting edge of the coulter enters the soil first and as the machine moves forward the compacting surface of the coulter is brought into engagement with one wall of the partially formed slot to firm the soil adjacent the top of the wall. At the rear of the coulter, behind the compacting surface, there is a delivery chute or tube for depositing the fertilizer into the slot formed by the coulter.

12 Claims, 4 Drawing Sheets

APPARATUS FOR HIGH SPEED APPLICATION OF LIQUID OR DRY FERTILIZER

RELATED APPLICATION

This application claims the benefit of the filing date of co-pending U.S. Provisional application Ser. No. 60/012,877, filed Mar. 5, 1996.

FIELD OF THE INVENTION

The present invention relates to an apparatus for placing either liquid or dry fertilizer beneath the surface of soil. It has particular use for agricultural applications, and is believed to be particularly useful in high residue farming conditions. Among the main advantages of the invention are: (1) that the fertilizer is deposited below the surface of the soil without primary tillage or substantially disturbing surface residue; and (2) the system can be operated at speeds of up to 11 miles per hour.

BACKGROUND OF THE INVENTION

In a conventional application where the farmer employs practices which leave little or no residue on the surface, dry fertilizer may be broadcast on the surface of the field, and a tillage implement, such as a chisel plow or field cultivator, may be used to mix the fertilizer with the top several inches of the soil being tilled.

Where no-till (or "minimum-till" or "high residue") farming practices are employed by the farmer, surface residue is present, and it is desired to leave the surface soil undisturbed as much as possible. Row crop planters designed for use in high residue conditions may have one to three coulters mounted in front of each planter row unit to perform a minimum amount of tillage ahead of the actual planting unit. This is insufficient for widespread mixing of soil and fertilizer, so surface application of fertilizer is impractical in combination with current planting practices. Chisel plows have also been suggested for tillage in high residue conditions. Some such chisel plows are designed to minimize the disturbance of the soil at the surface. Neither of these techniques just described have been widely used for the simultaneous application of fertilizer and deep tillage under high residue conditions.

Currently, there are a number of methods for applying fertilizer in high residue conditions. One such method uses very thin applicator knives which part the soil. A tube is located behind the knife to deposit the fertilizer in the slot formed by the knife. The disadvantage of this system is that the knife wears thin, and the deposit tube wears on the sides as they scrape against the walls of the slot.

Another method employs a coulter having ripples in the surface of the coulter extending radially outwardly of its center. The slot formed in this method is comparatively narrow so that the side walls of the slot are vertical and adjacent one another leaving a thin slot of uniform width. In the case of applying liquid fertilizer, because of the somewhat dry soil conditions in which fertilizer applicators of this type are used, the liquid fertilizer sometimes contacts the side walls of the slot and is "wicked" into the soil too close to the surface for effective application. Deeper fertilizer placement is more desirable.

Another method of applying liquid and dry fertilizer employs a flat coulter which is inclined in a vertical plane offset approximately seven degrees from the direction of travel—that is, the yaw of the plane of the disc is approximately seven degrees. These devices are generally used on row crop planters which are, of course, not designed to operate at speeds much higher than 4–6 miles an hour, and it is difficult to deposit the fertilizer at a depth greater than approximately two inches in devices of this nature because the coulter encounters high stress at depths deeper than two inches due to its substantial inclination relative to the line of travel.

SUMMARY OF THE INVENTION

The present invention employs a unique coulter having a flat, annular area or band adjacent the peripheral cutting edge which forms a slot. Inwardly of this flat band, and on one side of the coulter blade is an inclined compacting surface which angles outwardly and toward the axis of the coulter. The coulter may be angled in yaw only a slight amount so as to increase slightly the width of the slot being formed. Thus, the outer, cutting edge of the coulter enters the soil first and as the machine moves forward, the coulter rotates and begins to form a slot. The slot is narrow and has upright, parallel walls.

While the slot is being formed, the compacting surface of the coulter is brought into engagement with the partially formed slot. The compacting surface forces one sidewall of the slot outwardly and inclined, compacting and firming the soil adjacent the top of the slot only. Meanwhile, as the coulter continues to rotate, the flat, peripheral annular portion continues to form the slot to a deeper depth, while the compacting surface forms an inclined lip at the upper portion of the one side wall of the slot.

At the rear of the coulter, and behind the location where the compacting surface exits the soil, there is a delivery chute or tube for depositing the fertilizer into the slot formed by the coulter. Specifically, the discharge opening of the chute is located behind the compacting surface of the coulter and adjacent the compacted upper lip of the slot. The delivery tube is curved rearwardly adjacent the discharge opening. This reduces actual ground speed of the fertilizer to reduce bounce, and it forms a uniform, continuous band of fertilizer. Further, the discharge opening is narrower at the bottom so that the fertilizer, particularly in the case of particulate fertilizer, is deposited in a uniform, narrow stream adjacent the compacted lip of the furrow, just above the entrance to the narrow, lower section of the slot. The compacted surface of the furrow acts to guide or funnel the fertilizer downwardly into the narrower slot where the fertilizer is deposited.

On the other side of the coulter (namely, opposite the compacting surface) a support wheel is mounted so that the inner side of the wheel scrapes against the periphery of the coulter at the location where the coulter exits the slot, thereby compacting and firming the sidewall of the slot opposite the compacted, inclined surface of the slot. Thus, the wheel cooperates with the coulter to firm one generally vertical sidewall of the slot while the inclined compacting surface on the opposing side of the coulter firms the other sidewall of the slot while forming an inclined surface at the top of the slot. If the coulter encounters any irregularity, it raises the fertilizer delivery tube to clear the object or obstruction, which a four-bar linkage maintains the delivery tube in its original orientation. The scraping/firming wheel is mounted for independent vertical motion relative to the coulter and discharge tube; and both the wheel and the coulter are separately cushioned by springs into the working or use position.

If desired, a residue clearing device, such as a "spider" or tined wheel may be mounted in front of the coulter to clear residue before the slot is formed.

With the present apparatus, dry fertilizer may be deposited at a depth of 3–4 inches beneath the surface in firm soil, and at speeds of up to 11 miles per hour without any substantial disturbance of the surface of the soil in fields employing no-till procedures.

Other features and advantages of the present invention will be apparent to persons skilled in the art from the following detailed description of a preferred embodiment accompanied by the attached drawing wherein identical reference numerals will refer to like parts in the various views.

DETAILED DESCRIPTION OF THE ILLUSTRATED EMBODIMENTS

Figure 1:
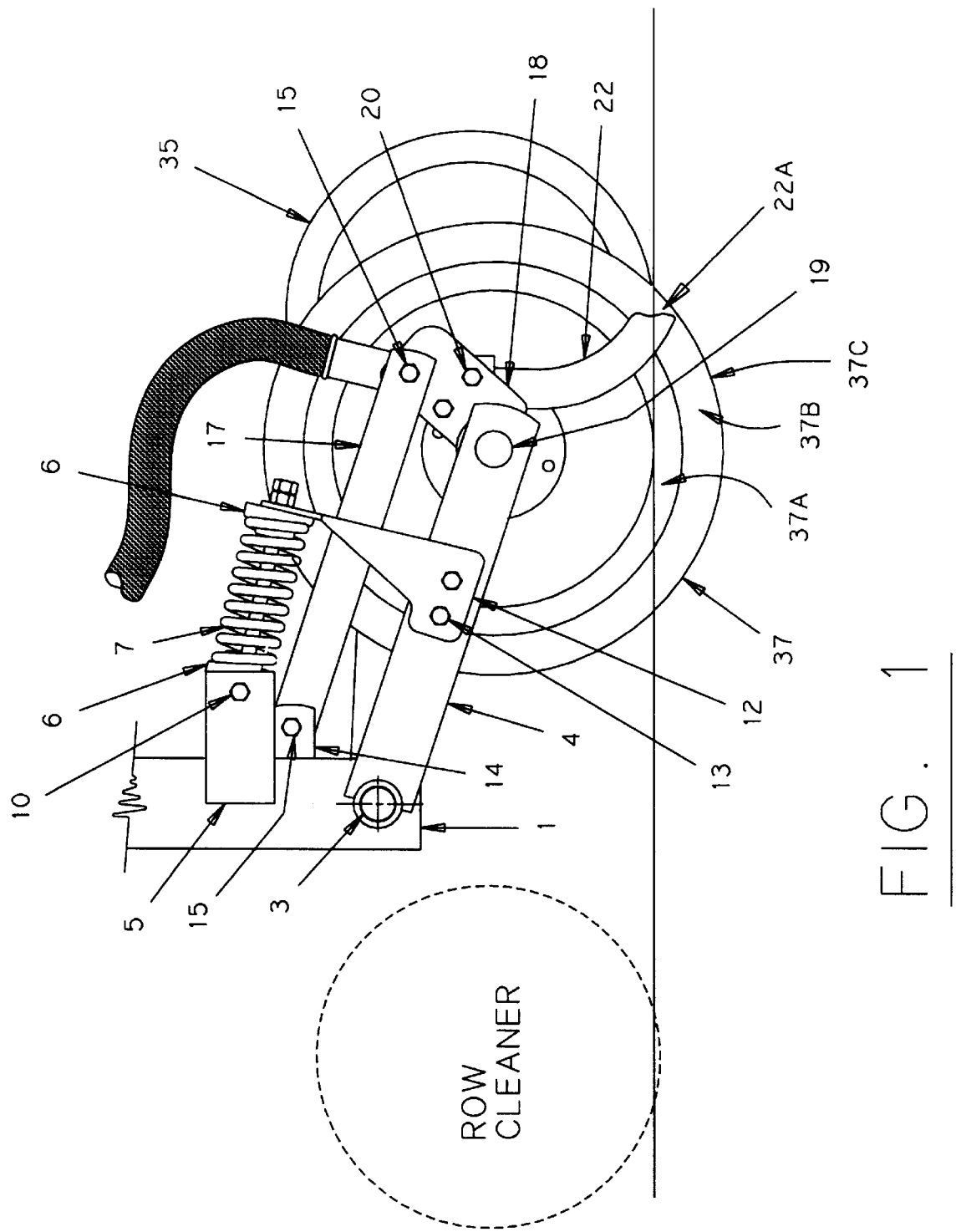
FIG. 1 is a side elevation view of a fertilizer applicator unit incorporating the present invention.
Figure 2:
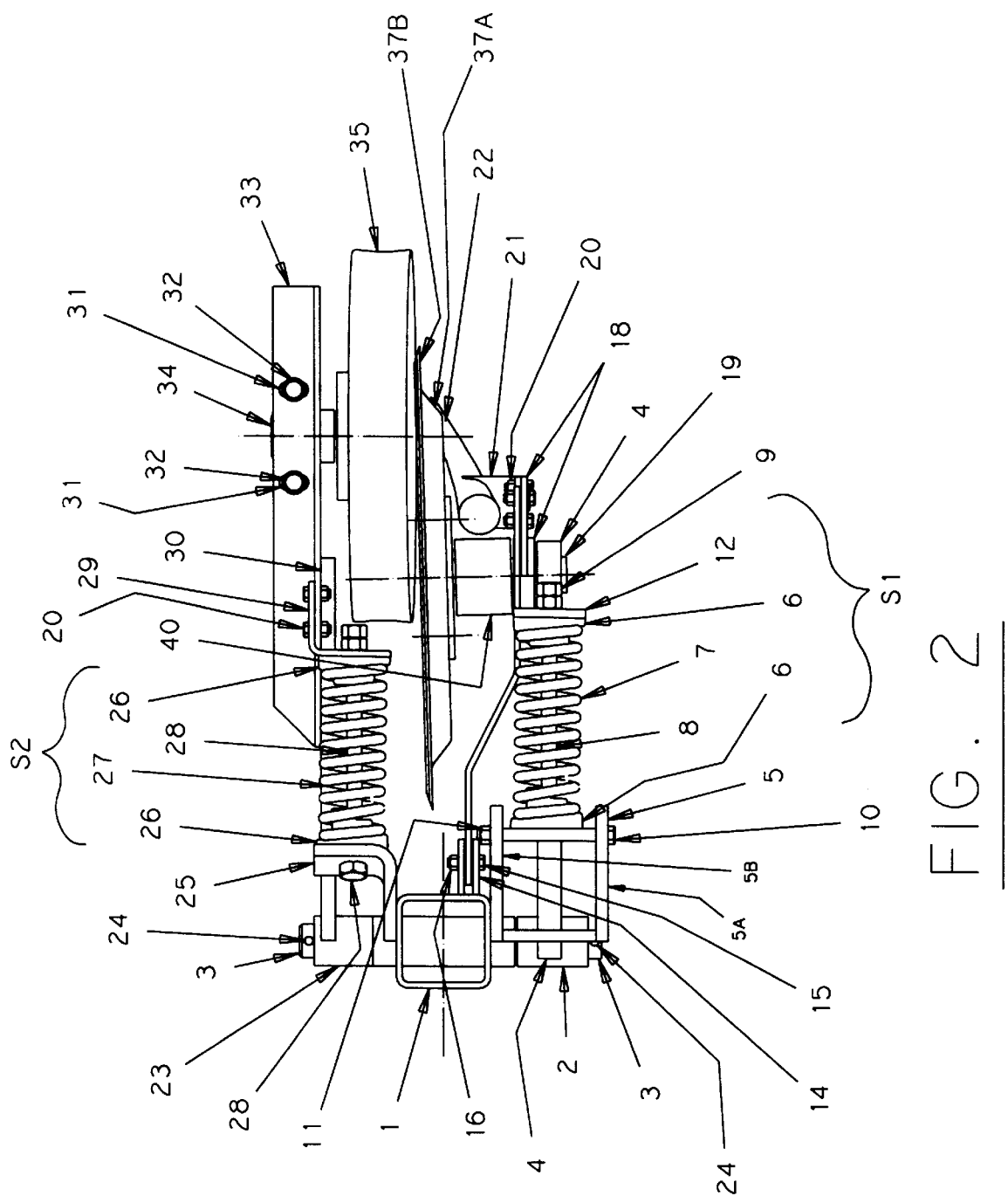
FIG. 2 is a top view of the apparatus of FIG. 1.

Turning now to the drawing, in FIGS. 1 and 2, the apparatus is intended to travel toward the left side of the drawing. Persons skilled in the art will understand that the present invention may be mounted to conventional frames or tool bars, either mounted to a tractor three-point hitch or drawn (that is, having their own support wheels). The tool bars or frames may be in sections of ten to fifteen feet, and the overall implement may have wing sections of the type which fold for transport, as is known in the agricultural implement field. The individual fertilizer applicator units which are the subject of the invention may be spaced laterally along the implement frame at intervals of 30 in. or less, or at the same row spacing which the farmer intends to use to space the rows of the next crop he plans. Row markers may be installed on the toolbar to permit the farmer accurately to place the fertilizer on the same row lines he intends to plant the crop. If the fertilizer is applied in the fall, row cleaners (shown diagrammatically in FIG. 1) can clean strips in register with the row lines of the intended crop. This will allow the soil to warm faster in the spring, and enable crops planted in the cleared strips to emerge sooner because the soil will warm up faster. The tillage coulter on a planter will fill what remains of the small slot formed by the fertilizer applicator after weathering over winter.

Turning then to FIG. 1, reference numeral 1 designates a vertical support member or standard which is attached to a horizontal tool bar or to a horizontal tubular frame member of a planter frame in front of a planter row unit, for example, depending upon how the farmer desires to use the unit. As best seen in FIG. 2, a box-shaped bracket extending in a rearward direction, designated 5, is welded to the side of the standard or support 1. A pivot shaft 3 is mounted in the walls of the support 1, and extends outwardly of both sides of the support 1 (FIG. 2).

A first spring seat 6 is welded to a bolt 10 forming a pivot shaft. The bolt is received in the side surfaces of the walls 5A, 5B of bracket 5.

A link 4 is welded to and rotates with a bushing 2 journaled on the pivot shaft 3. Link 4 extends rearwardly and is pivotally connected at its rear end to a plate or link 18.

A first spring assembly S1 (FIG. 2) cushions the coulter. It includes a spring 7 mounted with a spring bolt extending through it in a conventional manner. As viewed in FIGS. 1 and 2, the left end of the spring assembly S1 is rotatably secured to the bracket 5 by means of the pivot bolt 10. The right (rear) end of spring 7 is mounted to a bracket 12 secured by bolts 20 to the link 4. The spring 7 is preloaded to bias the link 4 (and a four-bar linkage, to be described, of which link 4 is a part) clockwise as seen in FIG. 1, thus biasing the coulter into the use or ground-engaging position, and the delivery tube 22 to its use or delivery position.

When the link 4 is raised, spring 7 is further compressed. The force of the compressed spring urges the link 4 (and the four-bar linkage) back to the position shown in FIG. 1. Spring assembly S1 thereby resiliently urges (i.e., cushions) the link 4 downwardly (clockwise about shaft 3). A shaft 19 carrying a hub 40 and a coulter 37 is mounted to the rear end of the link 4. The coulter 37 rotates in the hub 40. The plate or link 18 is rotatably mounted on shaft 19. Link 18 is also part of the four-bar linkage.

Figure 3:
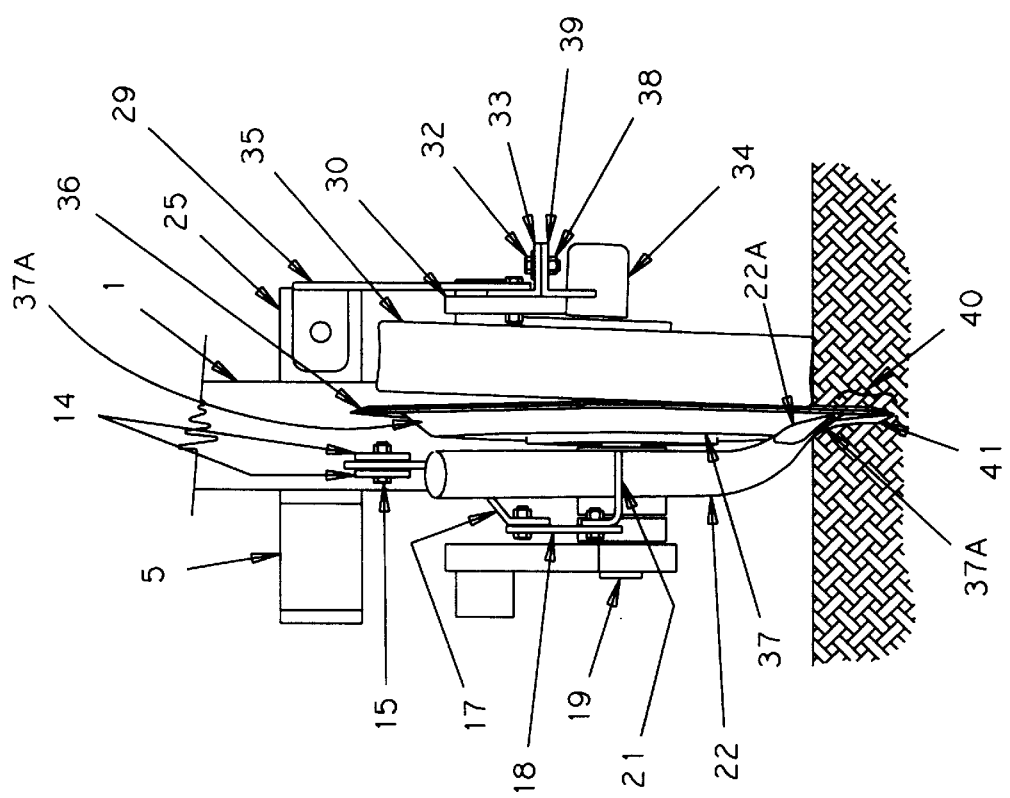
FIG. 3 is a rear view of the apparatus of FIG. 1.
Figure 4:
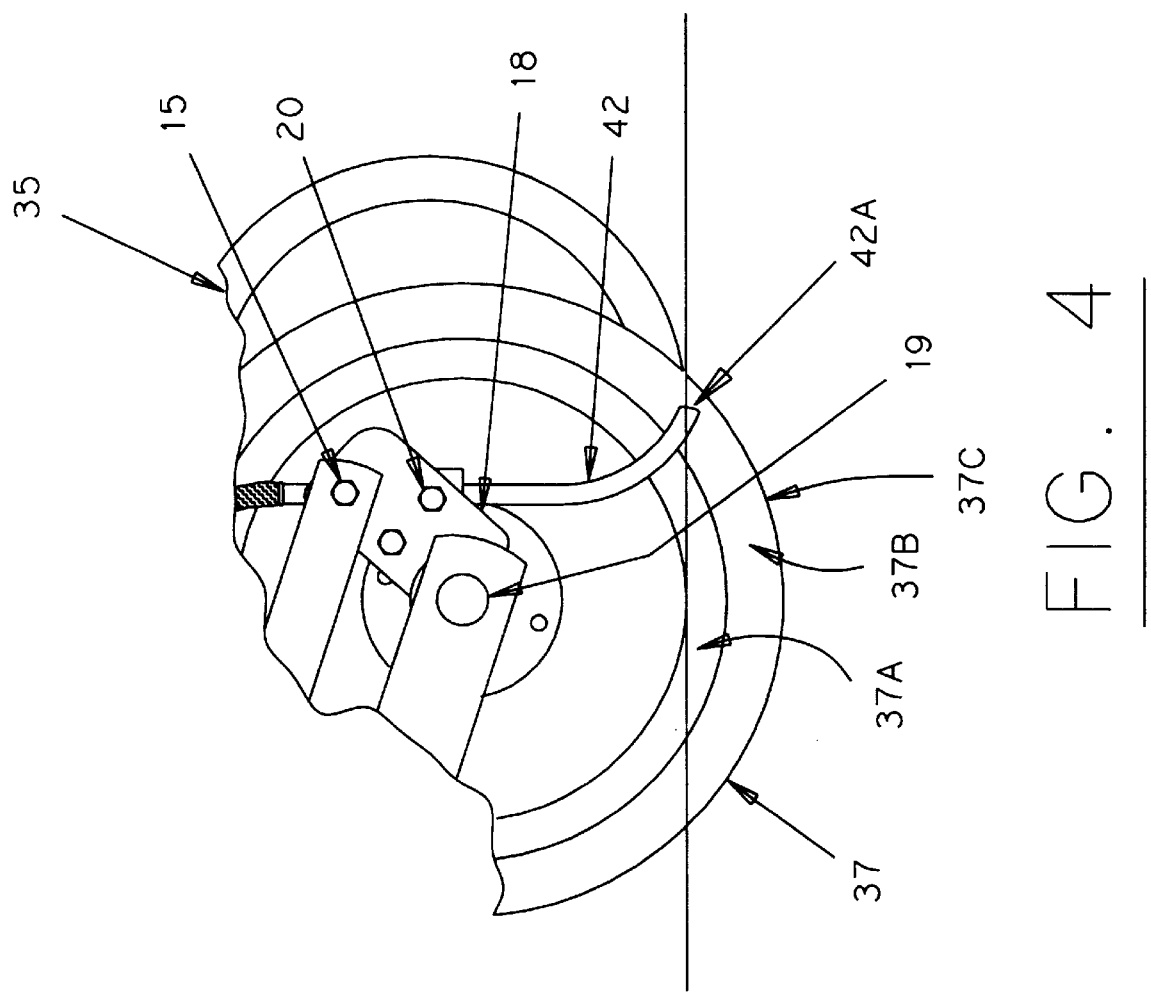
FIG. 4 is a side view showing the components of a liquid fertilizer applicator unit.

Coulter 37 includes, on its left side (FIG. 3), an outwardly extended portion in the general form of a pie tin, as best seen in FIG. 2, and including a compacting surface 37A. The compacting surface 37A, is best seen in FIGS. 2 and 3 is an annular region which is inclined outwardly and toward the center or axis of rotation of the coulter. That is, the compacting surface 37A is frusto-conical. At the upper part of the left wall of the slot being formed, however, as best seen in FIG. 3, the compacting surface 37A extends upwardly and outwardly of the left side of the coulter 37 to form a compacted, inclined surface or lip leading into the lower portion of the slot formed by the peripheral band 37B of the coulter immediately inward of the cutting edge 37C.

Cutting edge 37C is formed in the periphery of the coulter 37 by a camber 36, as distinguished from a V-shaped cutting edge. The camber 36 is formed on the right side of the coulter 37 in the illustrated embodiment. That is, the camber 36 is formed on the side of the coulter opposite the inclined compacting surface 37A. The coulter may have a slight inclination in yaw. That is, the coulter may be inclined approximately one-two degrees from a vertical plane parallel to the direction of travel, with the leading edge of the coulter located towards the side on which the inclined compacting surface 37A is located (i.e., the left side in FIG. 3).

Thus, the yaw of the coulter 37 (with the leading edge inclined slightly to the left) creates a leftward force or draft on the coulter blade as the unit is pulled in a forward direction. However, the yaw of the coulter blade is small enough that it does not interfere with the operating depth of the coulter blade which can be as great as 3–4 inches without significantly effecting the life of the coulter blade. Similarly, the camber 36 creates a slightly leftward force on the coulter blade.

The two leftward draft forces (as viewed in FIG. 3) just described are offset at least partially by the rightward draft force on the coulter blade 37 created by the compacting surface 37A, as will be further described below. These offsetting lateral draft forces might not precisely cancel one another, but they do tend to neutralize each other so that the net lateral force on the coulter blade is substantially reduced.

Persons skilled in the art will readily appreciate that the apparatus can be formed in mirror image, and it would be preferable to do so in the case where a number of units are employed on the same tool bar. One-half of the units would be formed as shown in FIG. 3, and the other half would be formed in mirror image so that the net lateral force created by the compacting surface 37A, cambered cutting edge 16 and inclination in yaw of the disc would be further reduced.

A wheel generally designated 35 in FIGS. 1 and 2 is mounted by means of a hub 34 (FIG. 3) to a bracket 33. The bracket 33 includes slots 31 (FIG. 2) which receive mounting bolts 32 which are also received in apertures in a lower angle bracket 39 located beneath and secured to, the bracket 33 by nuts 38. The slots 31 are elongated laterally to permit adjustment of the spacing of wheel 35 relative to the coulter. The wheel is mounted to rotate about a generally horizontal axis generally transverse to the direction of travel of the apparatus. The wheel is inclined from the vertical such that the left side of the bottom portion of the wheel engages the right side of the coulter 37 at the location where the coulter exits the soil (compare FIGS. 1 and 3). That is, the wheel 35 is canted slightly from the vertical as seen in FIG. 3. The side of the coulter opposite the compacting surface is sometimes referred to as the "opposing" surface of the coulter. It is the surface from which debris is removed by the wheel 35. The top of the wheel is spaced from the right side of the disc 37, but the bottom of wheel 37 is in rubbing contact with the disc as it exits the slot to remove debris or soil from the coulter. A further adjustment could be provided to adjust the wheel in a fore-and-aft direction.

The bracket 33 is welded to an arm 30, as seen in FIG. 2. Arm 30, in turn, is welded to a bushing 23 journaled on shaft 3 mounted to support 1. A second spring-cushion assembly, generally designated S2, includes a spring 27 received on a spring bolt. One end of the spring 27 is seated against bracket 25 which is welded to support 1; and the other end of spring 27 is seated against a bracket 29 secured by bolts 20 to the wheel bracket 33, thereby to resiliently urge the wheel 35 into engagement with the ground. Spring 27 is also provided with a preset force for urging the bracket 33 downwardly, and thus providing a downward cushion force on the wheel 35. The wheel 35 is not a depth gauge wheel, and it is not intended to support the weight of the coulter or the rest of the unit, so it could be replaced with a fixed or rotating blade scraper, but with less desirable results.

An offset link 17 is pivotally mounted at its front by pivot bolt 15 and nut 16 to a pair of spaced tabs 14 welded to the rear of support 1. The rear of link 17 is pivotally mounted at 36 to the top of plate 18. Thus, the four-bar linkage mentioned above included parallel links 4 and 17, plate 18 and support 1 (as well as tabs 14). The parallel linkage supports the fertilizer delivery tube 22, as will now be discussed. The primary purpose of the four-bar linkage is to maintain the fertilizer delivery tube in its normal, upright position as seen in the drawing even though it is raised if the coulter encounters an obstacle or very hard ground.

A mounting bracket 21 is secured at one end to a fertilizer delivery tube 22. The other end of bracket 21 is bolted to the plate 18. Delivery tube 22 has its upper, inlet opening coupled to a tube through which fertilizer passes from a source not shown. Typically the source is an air delivery source, where particulate fertilizer is employed, so the particles are under some slight pressure as they enter the delivery tube. The delivery tube is curved rearwardly at the bottom as seen in FIG. 1, and right up to the discharge opening. This causes fertilizer in the form of pellets to drop to the bottom of the tube, and to move rearward relative to the tube, reducing relative ground speed. Moreover, the curvature of the delivery tube is believed to create a centrifugal force on the small particles, causing them to remain near the bottom of the tube until they are discharged. This creates a stream of particles which is uniform and concentrated. Moreover, as seen in FIG. 3, the lower portion of the discharge opening 22A is formed into a "V" channel to direct the stream of particles into the lower portion of the slot formed by the peripheral band 37B of the coulter, which lower slot portion has a generally uniform width.

It will also be observed from FIGS. 1 and 3 that the discharge end of the delivery tube is tucked behind the rear of the compacting surface 37A; and the lower portion 22A of the discharge orifice of the delivery tube is adjacent the location where the flat, slot-forming peripheral band 37B of the disc is exiting the lower, uniform-width portion of the slot diagrammatically illustrated at 41 in FIG. 3. Thus, the fertilizer is discharged with a slight rearward movement relative to the forward-moving unit, and unto the upper, inclined, compacted lip of the left wall of the furrow. The lip acts to guide the fertilizer into the uniform-width, lower portion of the slot formed by the flat, outer peripheral band 37B of the coulter 37.

It will thus be understood that a first cushion spring assembly (S1) biases the coulter 37 into a downward, use position by means of the bracket 12 and link 4. In the use position, the flat, outer peripheral band 37B of the coulter enters the soil and forms a slot as the coulter rotates and the apparatus moves forwardly. The slot may be opened laterally a small amount beyond the width of the blade due to an inclination in yaw of the coulter, if this is desired. Following the point at which the leading edge of the coulter enters the soil, the leading edge of the coulter moves downwardly and rearwardly, relatively to the axis of the coulter. At some time thereafter the leading edge of the inclined compacting surface 37A engages the left side of the slot being formed by the cutting edge of the coulter and begins to compact the upper section of the left wall of the slot, forming an inclined surface or lip corresponding to the inclination of the compacting surface as seen at 37A in FIG. 3.

Thus, the formed lip on the left side of the slot (in the illustrated embodiment) provides an enlarged opening for the placement and guidance of fertilizer by means of the discharge tube 22 which is located such that the discharge orifice extends immediately above the formed incline of the top of the slot. Particulate fertilizer is then funneled through the rearwardly curved delivery tube, which forms the particulate matter into a uniform, narrow stream, as distinguished from a scattered dispersement. The band of particulate fertilizer is made even more uniform and regular by the U-shaped lower channel at the bottom of the discharge opening.

Fertilizer falls under gravity down into the slot which, by the time the fertilizer is deposited, may be up to four inches deep, the depth of slot being the radial sum of the flat peripheral portion of the coulter and the depth of the compacting surface 37A.

The four-bar linkage maintains the delivery tube in its normal, upright use position if the coulter 37 encounters an obstruction or irregular ground and the coulter rises. This reduces the tendency to disperse the light, somewhat hard particles, which otherwise might occur due to the bouncing that occurs in transversing a field. The force of the cushion spring 4 will act to restore the delivery tube to its use position, along with the coulter.

As mentioned above, the leftward draft on the peripheral portion of the coulter caused by the inclination in yaw of the coulter, together with the leftward force formed by the cambered edge 16, at least partially offset the rightward draft or force created by the compacting surface 37A.

The wheel 35 rides on the surface of the ground and it, too, is urged downwardly by a second spring cushion assembly (S2). Moreover, the wheel 35 is parallel to the fore and aft direction, but it is inclined slightly relative to the vertical, as seen in FIG. 3, so that the lower portion of the wheel engages the right side of the disc surface to scrape any debris from the disc and to form, in cooperation with the disc, the right side of the slot being cut by the disc. That is, there is a slight rightward pressure on the right wall of the slot being formed by the disc, and the weight and downward force of the wheel 35 firm the soil and add further compaction from the top. The coulter 37 is flat, for forming a slot, as distinguished from curved discs sometimes used for tillage or cultivation, and used for displacing soil.

In the embodiment described above and shown in FIGS. 1–4, the delivery tube 22 is designed for particulate fertilizer. The invention, however, contemplates the placement of liquid fertilizer, as shown in FIG. 5. In the case of liquid fertilizer, the fertilizer is also placed under slight positive pressure, and fed through a smaller tube 90, having a discharge orifice in the same position relative to the coulter, compacting surface and inclined lip of the slot, as with the particulate fertilizer applicator. The shape of the delivery tube and the shape of the discharge opening are not as important for liquid fertilizer. However, the location of the discharge opening—in the upper, sloped portion of the slot, behind the compacting surface of the disc is believed to be important and advantageous.

When applying liquid fertilizer under force, the delivery tube is also directed slightly rearwardly, but the tube has a discharge nozzle 42 located directly above the compacted lip and the fluid stream is directed into the groove to reduce splash of the liquid fertilizer.

Having thus disclosed in detail alternate embodiments of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. Apparatus for applying fertilizer beneath the surface of soil, comprising: a support; a coulter carried by said support for rotation about a generally horizontal axis, said coulter having a peripheral cutting edge and defining a slot-forming annular region extending radially inwardly of said cutting edge, and a tapered compacting surface extending outwardly and radially inwardly of said annular region of said coulter, said compacting surface arranged to engage a sidewall of a slot formed by said coulter for compacting the soil along an upper portion of said sidewall to form a tapered lead-in surface for guiding fertilizer toward the bottom of said slot; a delivery tube having a discharge aperture; means for mounting said delivery tube such that said discharge aperture is located behind said compacting surface of said coulter and above said tapered lead-in surface formed in said sidewall of said slot; whereby fertilizer passing through said discharge opening will fall onto said tapered lead-in surface and be guided into said slot.

2. The apparatus of claim 1 further comprising a member located on the opposing side of said coulter opposite said compacting surface and adapted to remove debris from said opposing side of said coulter at the location at which said coulter cutting edge leaves the soil.

3. The apparatus of claim 2 wherein said member comprises a rotating member mounted for rotation about a generally horizontal axis extending generally transverse to the direction of travel of said apparatus.

4. The apparatus of claim 3 wherein said rotating member comprises a ground-engaging wheel having a lower portion contacting said opposing surface of said coulter adjacent the location at which said coulter cutting edge leaves the soil.

5. The apparatus of claim 1 wherein said delivery tube extends downwardly and rearwardly in a continuous curve leading to said discharge aperture to impart a rearward movement to particulate matter being discharged relative to said apparatus and to form a uniform, narrow stream of such particles deposited onto said formed lead-in surface of said slot.

6. The apparatus of claim 5 wherein said discharge aperture of said delivery tube forms a V-shaped channel adjacent the bottom thereof to enhance the uniformity and consistency of said stream of particulate matter directed onto said formed lead-in surface of said slot.

7. The apparatus of claim 4 further including a cushion-spring assembly for mounting said wheel to said support while resiliently biasing said wheel into engagement with the surface of said soil adjacent the location at which said coulter exits the soil after forming said slot.

8. The apparatus of claim 7 wherein said wheel is inclined slightly away from said coulter at an upper portion thereof and is resiliently mounted to engage the surface of said coulter as said coulter exits said soil at the lower portion of said wheel.

9. The apparatus of claim 8 wherein said means for mounting said discharge tube includes a four-bar linkage, whereby when said coulter strikes an obstruction or is otherwise raised, said delivery tube is raised with said coulter and said delivery tube maintains the same disposition when raised, as said delivery tube has in its normal use position.

10. The apparatus of claim 8 further comprising second cushion spring means for resiliently biasing said four-bar linkage for urging said coulter to a use position.

11. For use in an agricultural implement for applying fertilizer beneath the surface of soil, a coulter having a circular peripheral cutting edge and first and second side surfaces, an annular flat band extending radially inwardly from said cutting edge to form a slot of generally uniform width and having spaced sidewalls, and a sole compacting surface extending outwardly of one of said side surfaces and arranged to compact an upper portion of only one of said sidewalls of said slot, such that a slot formed by drawing said coulter through the soil has one generally upright first sidewall from top to bottom and a second sidewall having a bottom portion defined by a generally upright wall portion spaced uniformly from said first sidewall, and a compacted inclined lead-in surface adjacent an upper edge of said second sidewall of said slot for assisting in the delivery of fertilizer material into said slot.

12. The apparatus of claim 11 wherein said compacting surface is frusto-conical and located on one side of said coulter, and said cutting edge is cambered for producing a lateral draft force to counter a lateral draft force generated by said compacting surface.

\* \* \* \* \*